United States Patent
Aoshima et al.

(10) Patent No.: US 11,682,503 B2
(45) Date of Patent: Jun. 20, 2023

(54) CONNECTOR FOR DEVICE

(71) Applicant: Yazaki Corporation, Tokyo (JP)

(72) Inventors: Kengo Aoshima, Kakegawa (JP); Takeo Ida, Makinohara (JP)

(73) Assignee: YAZAKI CORPORATION, Minato-ku (JP)

( * ) Notice: Subject to any disclaimer, the term of this patent is extended or adjusted under 35 U.S.C. 154(b) by 30 days.

(21) Appl. No.: 17/526,670

(22) Filed: Nov. 15, 2021

(65) Prior Publication Data

US 2022/0189662 A1 Jun. 16, 2022

(30) Foreign Application Priority Data

Dec. 16, 2020 (JP) .............................. JP2020-208284

(51) Int. Cl.
| | |
|---|---|
| *H01B 17/58* | (2006.01) |
| *H01B 17/66* | (2006.01) |
| *H01B 17/26* | (2006.01) |

(52) U.S. Cl.
CPC .......... *H01B 17/583* (2013.01); *H01B 17/66* (2013.01); *H01B 17/265* (2013.01)

(58) Field of Classification Search
None
See application file for complete search history.

(56) References Cited

U.S. PATENT DOCUMENTS

| | | | | | |
|---|---|---|---|---|---|
| 4,704,091 | A | * | 11/1987 | Owens | H01R 13/465 439/282 |
| 5,442,000 | A | * | 8/1995 | Kato | H01B 3/422 524/307 |
| 6,135,820 | A | * | 10/2000 | Chiang | H01R 13/4534 439/654 |
| 6,224,426 | B1 | * | 5/2001 | Kaneko | H01H 85/2045 439/949 |

(Continued)

FOREIGN PATENT DOCUMENTS

| | | | | | |
|---|---|---|---|---|---|
| CN | 102113427 | A | * | 6/2011 | ........... H01R 13/465 |
| CN | 103119800 | A | * | 5/2013 | ............. H01R 13/46 |

(Continued)

OTHER PUBLICATIONS

JP2012-252858 Translation and Original (Year: 2012).*
JP2017174575 Translation and Original (Year: 2017).*

*Primary Examiner* — Timothy J. Dole
*Assistant Examiner* — Muhammed Azam
(74) *Attorney, Agent, or Firm* — Sughrue Mion, PLLC (57) ABSTRACT

A connector for device is configured to be attached to a device housing including a hole and configured to hold an electric wire inserted into the hole, and the connector for device includes a tube-shaped housing into which the electric wire is inserted and which is configured to be inserted into one end of the hole of the device housing, and a front holder configured to be engaged with one end of the tube-shaped housing, wherein the front holder includes an electric wire holding portion to which the electric wire is held, and (Continued)

a locking portion that is continuous with the electric wire holding portion and configured to be engaged with the tube-shaped housing, and wherein the electric wire holding portion is positioned inside the tube-shaped housing in a state where the locking portion is engaged with the tube-shaped housing.

4 Claims, 6 Drawing Sheets

(56) References Cited

U.S. PATENT DOCUMENTS

| | | | | |
|---|---|---|---|---|
| 6,355,884 | B1* | 3/2002 | Gretz | H01R 13/745 174/659 |
| 6,371,807 | B1* | 4/2002 | Takagishi | H01R 13/5221 439/587 |
| 7,001,222 | B2* | 2/2006 | Mazzullo | H01R 13/4534 439/695 |
| 7,064,272 | B2* | 6/2006 | Auray | H01R 13/745 174/68.3 |
| 7,358,448 | B2* | 4/2008 | Auray | H02G 3/0691 174/650 |
| 7,448,887 | B2* | 11/2008 | Ikeya | H01R 13/639 439/157 |
| 8,568,159 | B2* | 10/2013 | Noda | H01R 13/562 439/470 |
| 9,059,534 | B2* | 6/2015 | Endo | H01R 13/5205 |
| D775,590 | S* | 1/2017 | Smith | D13/147 |
| 9,608,417 | B2* | 3/2017 | Smith | H02G 3/065 |
| 9,728,891 | B2* | 8/2017 | Casses | H02G 15/007 |
| 9,954,347 | B1* | 4/2018 | Volpone | H02G 3/0406 |
| 9,972,939 | B2* | 5/2018 | Sekino | H01R 13/639 |
| 10,295,753 | B2* | 5/2019 | Takano | G02B 6/3825 |
| 10,389,056 | B2* | 8/2019 | Suzuki | H01R 13/426 |
| 10,511,121 | B2* | 12/2019 | Milroy | H01R 13/5221 |
| D884,644 | S* | 5/2020 | Milroy | D13/146 |
| 10,756,485 | B2* | 8/2020 | Ohfuku | H01R 13/6275 |
| 10,811,821 | B2* | 10/2020 | Aoshima | H01R 13/44 |
| 10,847,924 | B2* | 11/2020 | Nguyen Nhu | H01R 13/521 |
| 10,985,496 | B2* | 4/2021 | Pamart | H01R 13/506 |
| 11,088,489 | B2* | 8/2021 | Takagi | H01R 13/6581 |
| 2003/0199193 | A1* | 10/2003 | Amemiya | H01R 13/5812 439/470 |
| 2004/0266243 | A1* | 12/2004 | Murakami | H01R 13/6277 439/271 |
| 2005/0061535 | A1* | 3/2005 | Kimura | F04B 35/04 174/88 C |
| 2010/0120282 | A1* | 5/2010 | Williams | H01R 13/622 439/352 |
| 2010/0130039 | A1* | 5/2010 | Chen | H01R 13/639 439/157 |
| 2012/0225587 | A1* | 9/2012 | Noda | H01R 13/562 439/626 |
| 2013/0168150 | A1 | 7/2013 | Sakakura | |
| 2013/0217262 | A1* | 8/2013 | Ikeda | H01R 13/521 439/544 |
| 2014/0057476 | A1* | 2/2014 | Kamiya | H01R 13/629 439/345 |
| 2015/0144395 | A1* | 5/2015 | Tanaka | H02G 3/22 174/668 |
| 2015/0144396 | A1* | 5/2015 | Tanaka | H02G 15/007 174/668 |
| 2015/0177467 | A1* | 6/2015 | Gniadek | H01R 13/625 439/365 |
| 2016/0134092 | A1 | 5/2016 | Bonvallat et al. | |
| 2016/0276776 | A1* | 9/2016 | Motohashi | H01R 13/5808 |
| 2017/0170602 | A1* | 6/2017 | Matsumoto | H01R 13/057 |
| 2018/0034187 | A1* | 2/2018 | Sekino | H01R 13/639 |
| 2018/0034201 | A1* | 2/2018 | Sekino | H01R 13/4368 |
| 2018/0034203 | A1* | 2/2018 | Sekino | H01R 31/08 |
| 2018/0048090 | A1* | 2/2018 | Kawai | H01R 13/5829 |
| 2018/0048091 | A1* | 2/2018 | Kawai | H01R 12/65 |
| 2018/0358737 | A1 | 12/2018 | Endo et al. | |
| 2018/0366843 | A1* | 12/2018 | Maki | H01R 13/111 |
| 2019/0081430 | A1* | 3/2019 | Saitoh | H02G 3/0462 |
| 2019/0190185 | A1* | 6/2019 | Mori | H01R 13/6581 |
| 2019/0356087 | A1* | 11/2019 | Pamart | H01R 13/5812 |
| 2020/0044388 | A1* | 2/2020 | Kanda | H01R 13/641 |
| 2020/0136311 | A1* | 4/2020 | Narama | H01R 13/639 |
| 2020/0313347 | A1* | 10/2020 | Iizuka | H01R 13/6666 |
| 2021/0249810 | A1* | 8/2021 | Misu | H01R 13/5812 |

FOREIGN PATENT DOCUMENTS

| | | | | |
|---|---|---|---|---|
| CN | 103582983 | A* | 2/2014 | B60L 3/0069 |
| CN | 104620445 | A* | 5/2015 | H01R 13/4362 |
| CN | 109066213 | A* | 12/2018 | H01R 13/62938 |
| CN | 110168811 | A* | 8/2019 | H01R 13/5812 |
| CN | 110690625 | A* | 1/2020 | H01R 13/629 |
| CN | 111384636 | A* | 7/2020 | H01R 13/502 |
| CN | 111725651 | A* | 9/2020 | H01R 13/501 |
| DE | 102007026582 | B3* | 12/2008 | H01R 13/4362 |
| DE | 102015012325 | A1* | 4/2016 | H01R 13/5812 |
| DE | 102015012327 | A1* | 4/2016 | H01R 13/5205 |
| DE | 102019212939 | A1* | 3/2020 | B60R 16/0222 |
| EP | 1873871 | A2* | 1/2008 | H01R 13/5208 |
| EP | 2495826 | A1* | 9/2012 | H01R 13/562 |
| EP | 2662937 | A1* | 11/2013 | H01R 13/518 |
| EP | 2919330 | A1* | 9/2015 | H01F 7/0252 |
| EP | 2784878 | B1* | 9/2016 | H01R 13/4367 |
| EP | 3073577 | A1* | 9/2016 | H01R 13/193 |
| EP | 3651285 | A1* | 5/2020 | H01R 13/4365 |
| JP | H10177876 | A* | 6/1998 | |
| JP | 2010503178 | A* | 1/2010 | |
| JP | 2012252858 | A* | 12/2012 | B60L 3/0069 |
| JP | 2015079710 | A* | 4/2015 | H01R 13/502 |
| JP | 2015-125846 | A | 7/2015 | |
| JP | 2017-73217 | A | 4/2017 | |
| JP | 2017174575 | A* | 9/2017 | H01R 13/5812 |
| JP | 2018200752 | A* | 12/2018 | H01R 13/42 |
| JP | 6508015 | B2* | 5/2019 | H01B 7/0045 |
| JP | 2019164945 | A* | 9/2019 | H01R 13/426 |
| JP | 6735289 | B2* | 8/2020 | H01R 13/4361 |
| KR | 20090033766 | A* | 4/2009 | |
| KR | 20100114366 | A* | 10/2010 | |
| KR | 20130024681 | A* | 3/2013 | |
| KR | 20210078321 | A* | 6/2021 | |
| WO | WO-2013012010 | A1* | 1/2013 | H01R 13/111 |
| WO | WO-2013171982 | A1* | 11/2013 | H01R 13/42 |
| WO | WO-2014147761 | A1* | 9/2014 | B60L 53/16 |
| WO | WO-2015146785 | A1* | 10/2015 | H01R 13/6272 |
| WO | WO-2017099148 | A1* | 6/2017 | H01R 13/502 |
| WO | WO-2019045040 | A1* | 3/2019 | H01R 13/4362 |
| WO | WO-2019142762 | A1* | 7/2019 | H01R 13/516 |

* cited by examiner

CONNECTOR FOR DEVICE

TECHNICAL FIELD

The present invention relates to a connector for device.

BACKGROUND

A wide variety of electronic devices are mounted on automobiles, and wire harnesses are wired to transmit electric power, control signals and the like to the electronic devices. The wire harness includes a plurality of electric wires and a connector, and the connector is fitted to a connector of the electronic device or to a connector of another wire harness for connection with said electronic device or said another wire harness. As a connector used for the wire harness as described above, there is disclosed a connector including a connector housing that houses a terminal connected to an end of an electric wire and a rear holder that is attached to the connector housing (see Patent Document 1).

A conventional connector disclosed in Patent Document 1 includes a connector housing that houses a terminal connected to an end of an electric wire and a rear holder that is attached to the connector housing. The rear holder includes a pair of divided portions and a hinge for connecting the pair of divided portions. Each divided portion has a plate-shaped divided portion body and a gutter-shaped portion standing from the divided portion body. That is, the gutter-shaped portion is standing in a direction away from the connector housing. The pair of divided portions is configured such that, in a state where they are brought close to each other, the gutter-shaped portions form an electric wire holding portion in which the electric wire is inserted and held.

PRIOR ART DOCUMENT

Patent Document 1: JP 2015-125846 A

SUMMARY OF THE INVENTION

Problem to be Solved by the Invention

However, in the conventional connector, the electric wire holding portion is provided so as to stand (project) in the direction away from the connector housing (the direction in which the electric wire extends). Thus, its outermost shape is defined by the electric wire holding portion, which causes an increase in size.

An object of the present invention is to provide a connector for device which is downsized.

Solution to the Problem

In order to achieve the above-described object, the present invention provides, in one aspect, a connector for device configured to be attached to a device housing including a hole and configured to hold an electric wire inserted into the hole, the connector for device including a tube-shaped housing into which the electric wire is inserted and which is configured to be inserted into one end of the hole of the device housing, and a front holder configured to be engaged with one end of the tube-shaped housing. The front holder includes an electric wire holding portion to which the electric wire is held, and a locking portion that is continuous with the electric wire holding portion and that is configured to be engaged with the tube-shaped housing. The electric wire holding portion is positioned inside the tube-shaped housing in a state where the locking portion is engaged with the tube-shaped housing.

Advantageous Effect of the Invention

According to the present invention, in a state where the connector for device is attached to the device housing, the electric wire holding portion of the front holder does not project to the outside of the device housing, thereby downsizing the connector for device in the direction in which the electric wire extends. In addition, since the electric wire holding portion is positioned inside the housing, an access thereto from the outside is blocked and thus the electric wire holding portion is protected.

DETAILED DESCRIPTION OF THE EXEMPLARY EMBODIMENTS

Figure 1:
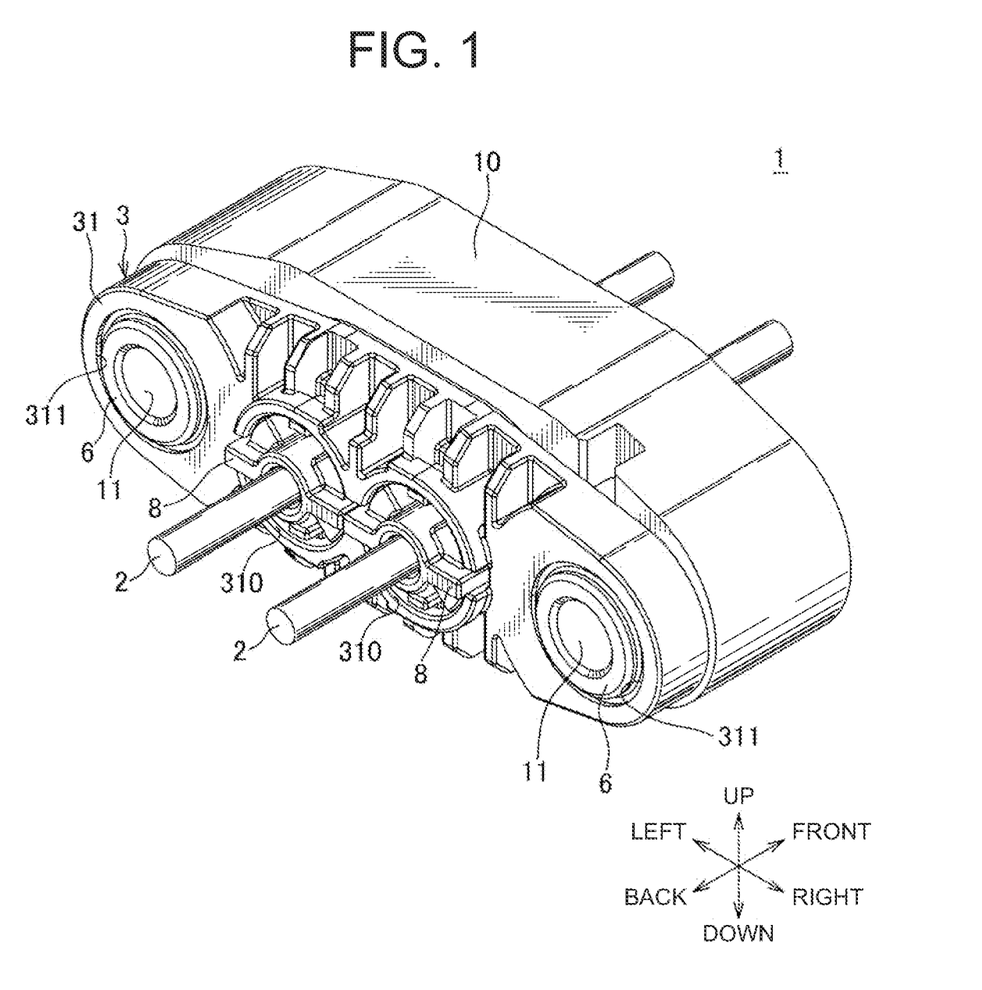
FIG. 1 is a perspective view showing a connector for device according to one embodiment of the present invention, in which the connector for device is mounted on a device housing including a hole.
Figure 2:
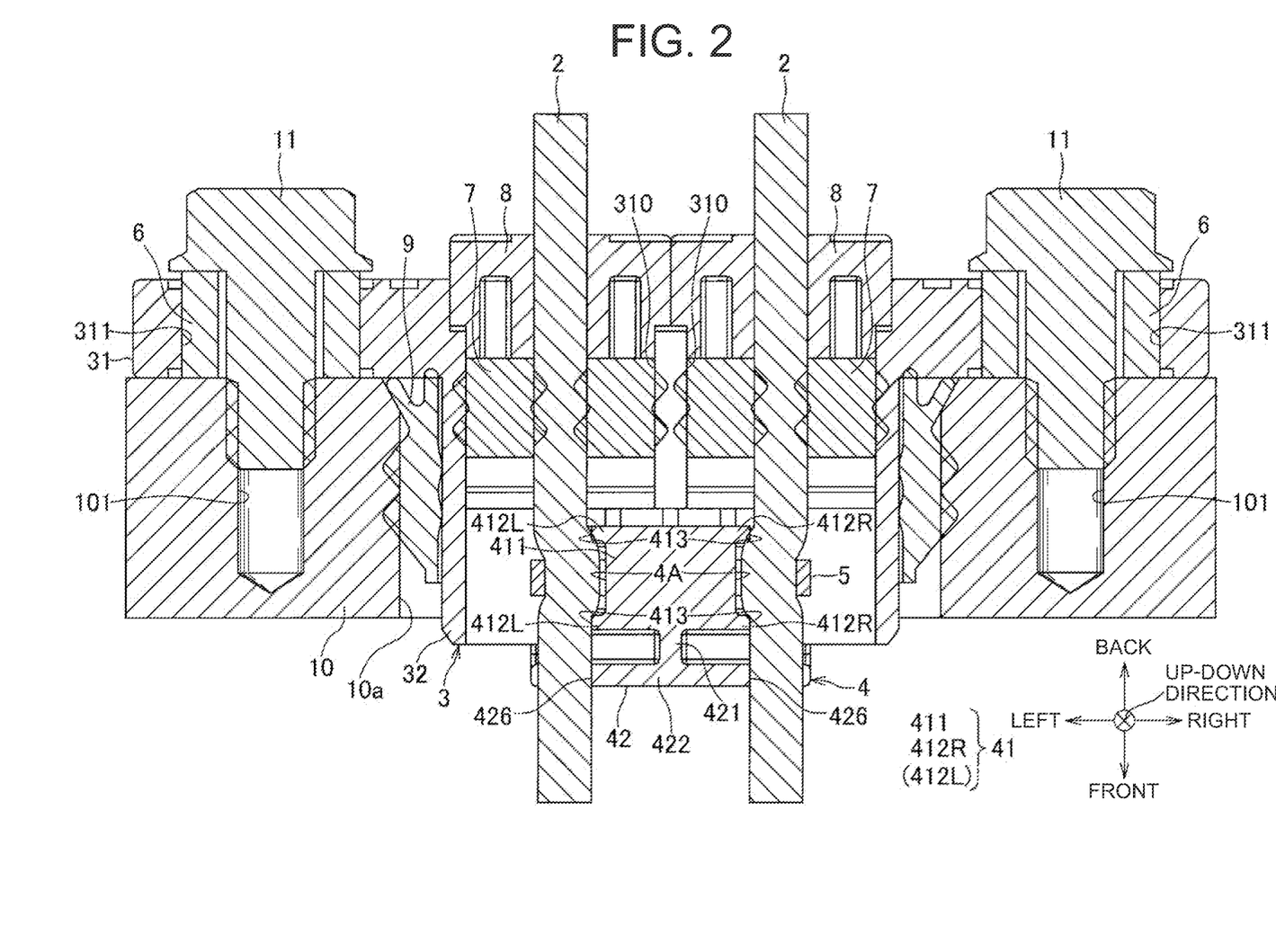
FIG. 2 is a cross-sectional view of FIG. 1.
Figure 3:
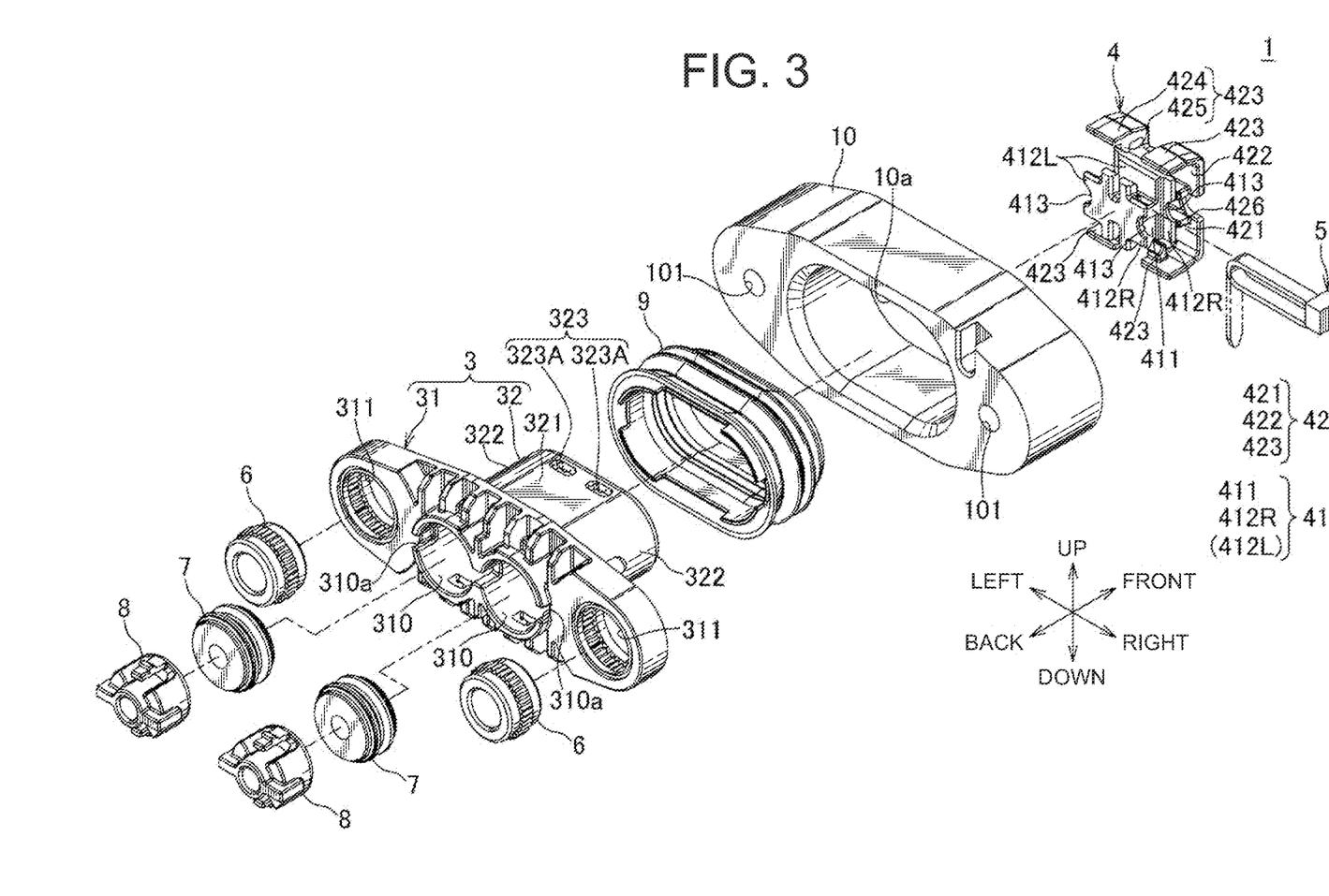
FIG. 3 is an exploded perspective view showing the connector for device.

In the following, an embodiment of the present invention will be described with reference to FIG. 1 to FIG. 6B. FIG. 1 is a perspective view showing a connector for device 1 according to an embodiment of the present invention, in which the connector for device 1 is attached to a device housing 10 having an opening 10a (hole). FIG. 2 is a cross-sectional view of FIG. 1. FIG. 3 is an exploded perspective view showing the connector for device 1. As shown in FIG. 1 and FIG. 2, the connector for device 1 according to this embodiment is configured to be attached to the opening 10a (a hole shown in FIG. 2) of the device housing 10 to constitute a wire harness to be wired on an automobile or the like. As shown in FIG. 1, the connector for device 1 is fixed to the device housing 10 by bolts 11 and in this state it is mounted on a vehicle.

As shown in FIG. 2 and FIG. 3, the connector for device 1 is configured to hold a pair of electric wires 2, 2 (shown in FIG. 2) inserted into the opening 10a of the device housing 10, and includes a housing 3 into which the electric wires 2 are inserted and which is fixed to the device housing 10, a front holder 4 configured to be engaged with the housing 3, and a binding band 5 configured to be wound around the front holder 4 such that the electric wires 2 are held to the front holder 4. In the following, a direction in which the opening 10a (hole) penetrates the device housing 10 may be referred to as "front-back direction", one direction which is orthogonal to "front-back direction" may be referred to as "left-right direction", and another direction orthogonal to "front-back direction" may be referred to as "up-down direction".

As shown in FIG. 2 and FIG. 3, the housing 3 includes a plate-shaped device fixing portion 31 and a tube-shaped insertion portion 32 which are integrally formed. The plate-shaped device fixing portion 31 is configured to be fixed, by bolts, to a front face of the device housing 10, and the tube-shaped insertion portion 32 is formed to extend forward in a tube shape from the device fixing portion 31 and communicates with a later-described pair of electric wire insertion portions 310, 310 of the device fixing portion 31, and the tube-shaped insertion portion 32 is configured to be inserted into the opening 10a of the device housing 10.

As shown in FIG. 2 and FIG. 3, the device fixing portion 31 is provided with a pair of bolt insertion portions 311, 311 into which a pair of bolts 11, 11 (shown in FIG. 2) is inserted, respectively, and the pair of electric wire insertion portions 310, 310 into which the pair of electric wires 2, 2 is inserted, respectively. The pair of electric wire insertion portions 310, 310 is disposed adjacent to each other in the right-left direction, and the pair of bolt insertion portions 311, 311 is disposed on both right and left sides of the pair of electric wire insertion portions 310, 310.

As shown in FIG. 3, each bolt insertion portion 311 is formed in a circular tube shape and is arranged such that an axis thereof extends in the front-back direction. Each bolt insertion portion 311 is configured such that, in a state where the device fixing portion 31 is placed on the front face of the device housing 10, the bolt 11 is inserted into each bolt insertion portion 311 and is screwed to a screw hole 101 of the device housing 10. A bolt sealing member 6 is interposed between each bolt insertion portion 311 and the bolt 11.

As shown in FIG. 3, each electric wire insertion portion 310 is formed in a circular tube shape and is arranged such that an axis thereof extends in the front-back direction. An electric wire sealing member 7 and an electric wire exterior member 8 that is disposed behind the electric wire sealing member 7 are provided inside each electric wire insertion portion 310. The electric wire sealing member 7 is configured to be press-fitted into the electric wire insertion portion 310 with the electric wire 2 being inserted into the electric wire sealing member 7. The electric wire exterior member 8 is configured to be engaged with a rear edge 310a of the electric wire insertion portion 310 with the electric wire 2 being inserted into the electric wire exterior member 8.

As shown in FIG. 3, the tube-shaped insertion portion 32 is formed in an oblong tube shape and includes a pair of flat plate portions 321, 321 opposing in the up-down direction (only one of which is shown in FIG. 3) and a pair of arcuate portions 322, 322 that is continuous with the pair of flat plate portions 321, 321. The tube-shaped insertion portion 32 communicates with the pair of electric wire insertion portions 310, 310, so the electric wires 2 are inserted therein. Further, the tube-shaped insertion portion 32 is configured to be inserted into the opening 10a of the device housing 10 in a state where the device fixing portion 31 is placed on the surface of the device housing 10. Further, the tube-shaped insertion portion 32 is inserted into a device packing 9. With the tube-shaped insertion portion 32 being inserted into the device packing 9, the tube-shaped insertion portion 32 is inserted into the opening 10a of the device housing 10.

Further, as shown in FIG. 3, the tube-shaped insertion portion 32 is provided with a to-be-locked portion 323 with which a locking portion 42 of the front holder 4 is engaged. The to-be-locked portion 323 is disposed at a front end of the tube-shaped insertion portion 32 and is configured to be exposed in a state where the tube-shaped insertion portion 32 is inserted into the device packing 9. The to-be-locked portion 323 is constituted of four to-be-locked holes 323A (only two of which are shown in FIG. 3). The four to-be-locked holes 323A are provided such that two of which are provided to each flat plate portion 321, and the two to-be-locked holes 323A, 323A provided in each flat plate portion 321 are arranged side by side in the right-left direction.

Figure 4:
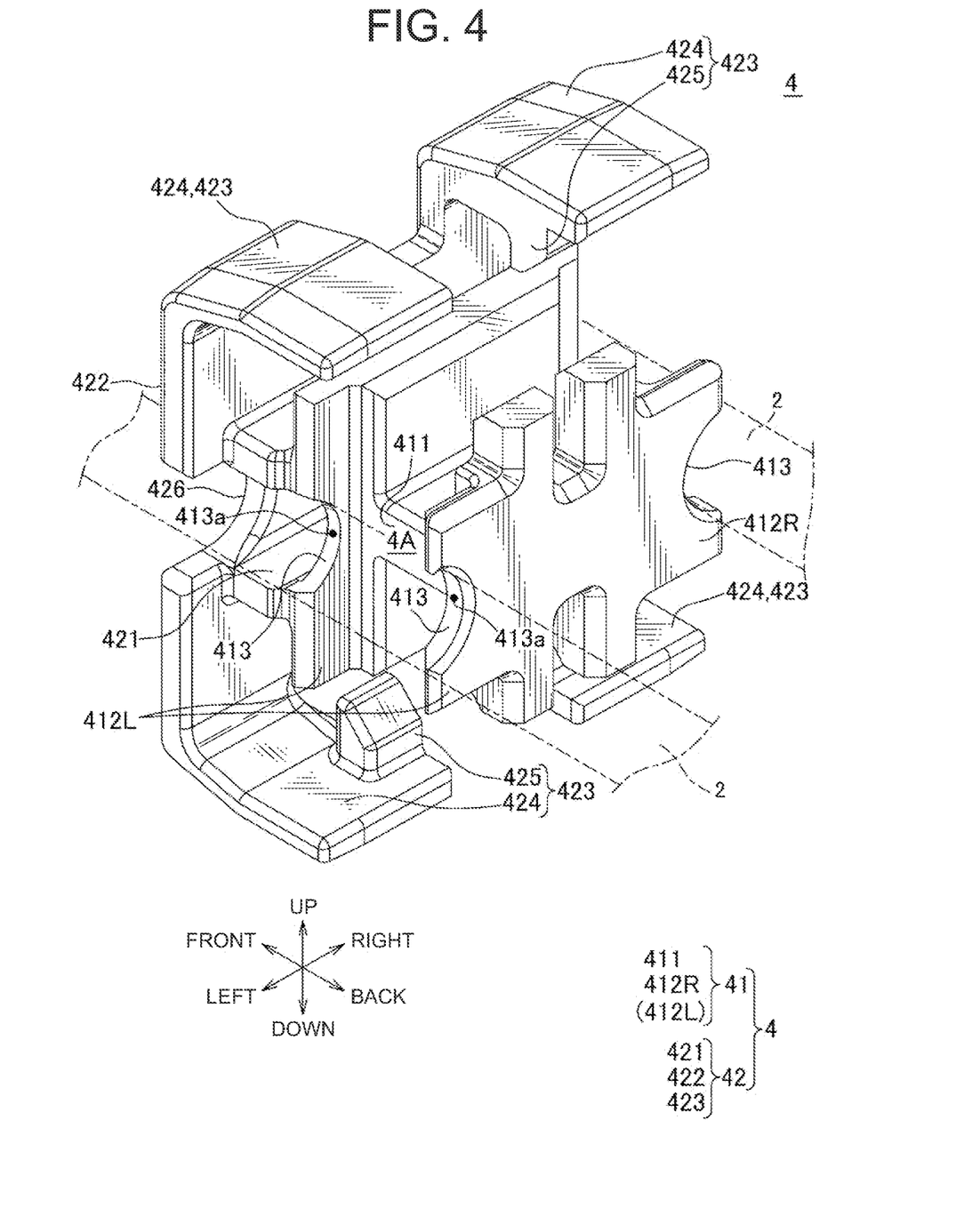
FIG. 4 is a perspective view showing a front holder that constitutes the connector for device.
Figure 5A:
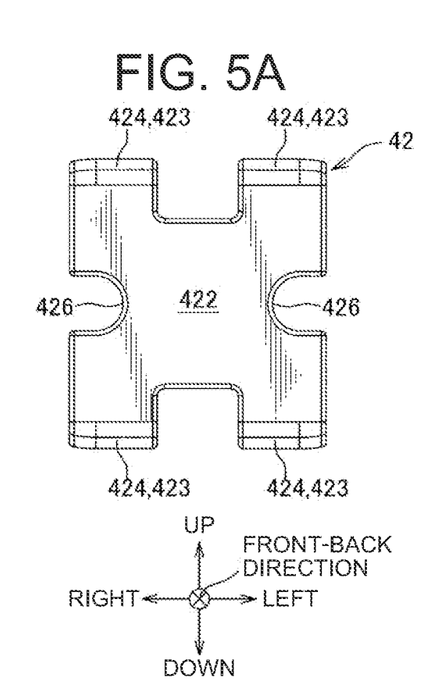
FIGS. 5A to 5D show the front holder, FIG. 5A being a plan view, FIG. 5B being a side view seen from one side, FIG. 5C being a rear view, and FIG. 5D being a side view seen from a direction orthogonal to said one side.
Figure 5B:
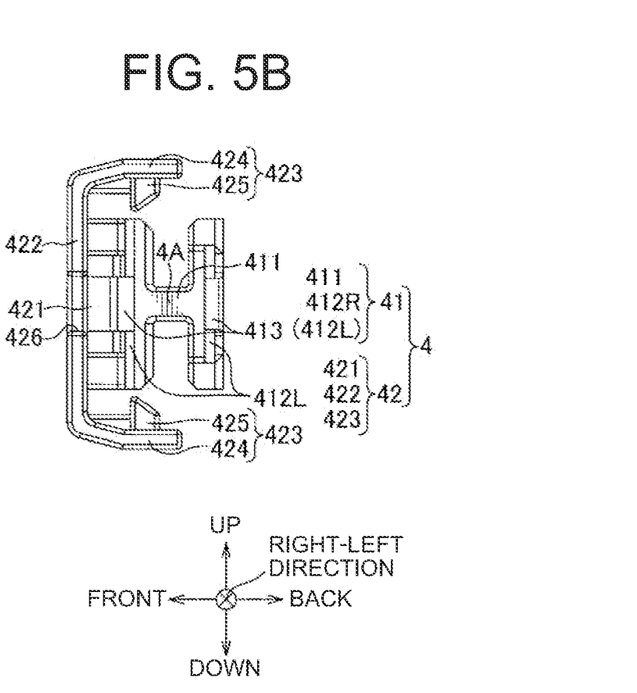
Figure 5C:
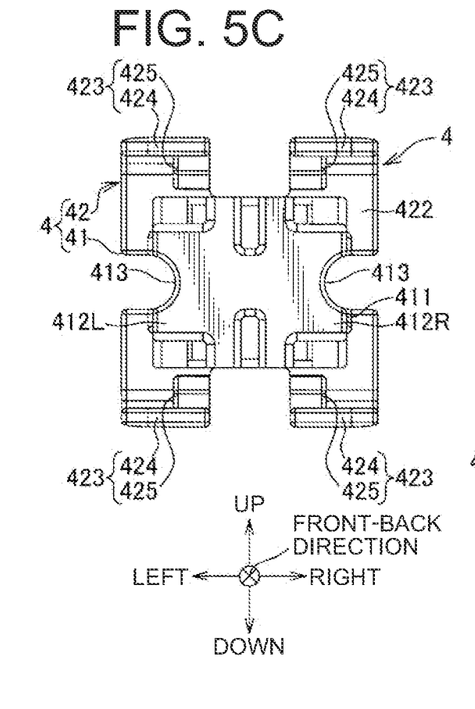
Figure 5D:
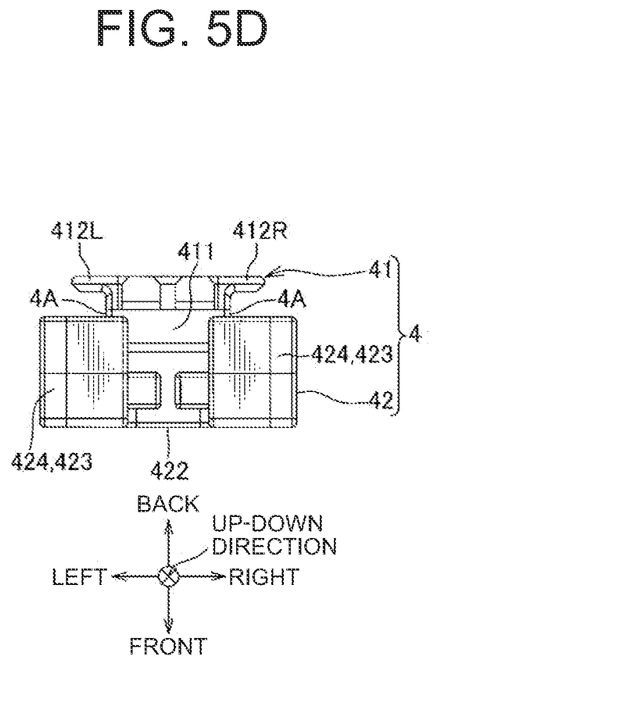

As shown in FIG. 2, FIG. 4, and FIG. 5D, the front holder 4 includes the electric wire holding portion 41 and the locking portion 42 which are integrally formed. The electric wire holding portion 41 is configured such that the binding band 5 (shown in FIG. 2) is wound around it to hold respective electric wires 2 (shown by a chain line in FIG. 4) on both right and left sides. The locking portion 42 is continuous with the front side of the electric wire holding portion 41 and is configured to be engaged with the to-be-locked portion 323 of the tube-shaped insertion portion 32 of the housing 3.

As shown in FIG. 4 and FIG. 5A-5D, the electric wire holding portion 41 includes a holding portion body 411 and each pair of electric wire supporting portions 412R (412L), 412R (412L) projecting to the right direction and to the left direction from both ends in the front-back direction of the holding portion body 411. The pair of electric wire supporting portions 412R, 412R is disposed on the right side of the holding portion body 411, and the pair of electric wire supporting portions 412L, 412L is disposed on the left side of the holding portion body 411. The pair of electric wire supporting portions 412R, 412R and the pair of electric wire supporting portions 412L, 412L have the same function or the same configuration, thus the pair of electric wire supporting portions 412L, 412L will be explained below and the explanation of the pair of electric wire supporting portions 412R, 412R is omitted.

As shown in FIG. 4 and FIG. 5B, the holding portion body 411 is formed in a plate shape extending in the front-back direction between the pair of electric wire supporting portions 412L, 412L. The holding portion body 411 is provided with a flat face (hereinafter referred to as the bottom face 4A) extending in the front-back direction and in the up-down direction. The pair of electric wire supporting portions 412L, 412L is provided to project to the left from the bottom face 4A of the holding portion body 411. That is, the bottom face 4A is a face on which a basal portion of each electric wire supporting portion 412L is provided.

As shown in FIG. 4, each electric wire supporting portion 412L is formed in a plate shape extending in a plane direction including the up-down direction and the right-left direction (i.e., a plane direction intersecting a direction in which the electric wire 2 extends), and a left edge of each electric wire supporting portion 412L (i.e., an edge thereof in the projecting direction) is cut out to form a recessed portion 413 for accommodating each electric wire 2. In this embodiment, each recessed portion 413 is formed in a semicircular shape having substantially the same curvature as an outer diameter of the electric wire 2, and in each recessed portion 413, a bottom portion 413a (shown in FIG. 4) that is located closest to the bottom face 4A of the holding portion body 411 is spaced to the left from the bottom face 4A of the holding portion body 411. That is, a step is formed between the bottom portion 413a of each recessed portion 413 and the bottom face 4A of the holding portion body 411. Thus, the electric wire 2 is squeezed by the binding band 5 and bent so as to approach the bottom face 4A of the holding portion body 411.

As shown in FIG. 4, FIG. 5A, FIG. 5B, and FIG. 5C, the locking portion 42 includes a standing portion 421 standing toward the front of the electric wire holding portion 41, a plate-shaped portion 422 continuous with the standing portion 421 and extending in the plane direction including the up-down direction and the right-left direction, and locking pieces 423 which are formed to extend backward from respective upper and lower edges of the plate-shaped portion 422 so as to be engaged with the to-be-locked portion 323 of the housing 3.

The plate-shaped portion 422 is cut out at right and left edges thereof to form recessed portions 426 for accommodating the respective electric wires 2. In this embodiment, each recessed portion 426 is formed in a semicircular shape having substantially the same curvature as the outer diameter of the electric wire 2. Each recessed portion 426 is arranged linearly in front of each recessed portion 413.

As shown in FIG. 4, the locking pieces 423 are provided two on each of the upper and lower edges of the plate-shaped portion 422, thus total of four locking pieces 423 are provided. Each locking piece 423 includes a plate-shaped extended piece 424 which is formed to extend backward from the upper and lower edges of the plate-shaped portion 422, and a locking projection 425 which is provided at the extended piece 424 to be engaged with the to-be-locked hole 323A of the housing 3. The extended piece 424 is provided to face an outer face of each flat plate portion 321 of the tube-shaped insertion portion 32 of the housing 3, and when the locking projection 425 is fitted into the to-be-locked hole 323A, the to-be-locked portion 323 of the tube-shaped insertion portion 32 is engaged with the locking portion 42 of the front holder 4.

An assembly procedure of the above-described connector for device 1 will be described with reference to FIG. 3 and FIG. 4, FIG. 6A, and FIG. 6B. First, the tube-shaped insertion portion 32 of the housing 3 is inserted into the device packing 9 so the device packing 9 is mounted on the tube-shaped insertion portion 32. Also, the electric wire 2 is inserted into the electric wire sealing member 7 and the electric wire exterior member 8 such that the electric wire exterior member 8 is positioned behind the electric wire sealing member 7. A part of each electric wire 2 located on the front with respect to the electric wire sealing member 7 is sequentially inserted into each electric wire insertion portion 310 of the device fixing portion 31 and into the tube-shaped insertion portion 32 of the housing 3, and is drawn out to the front of the tube-shaped insertion portion 32.

Figure 6A:
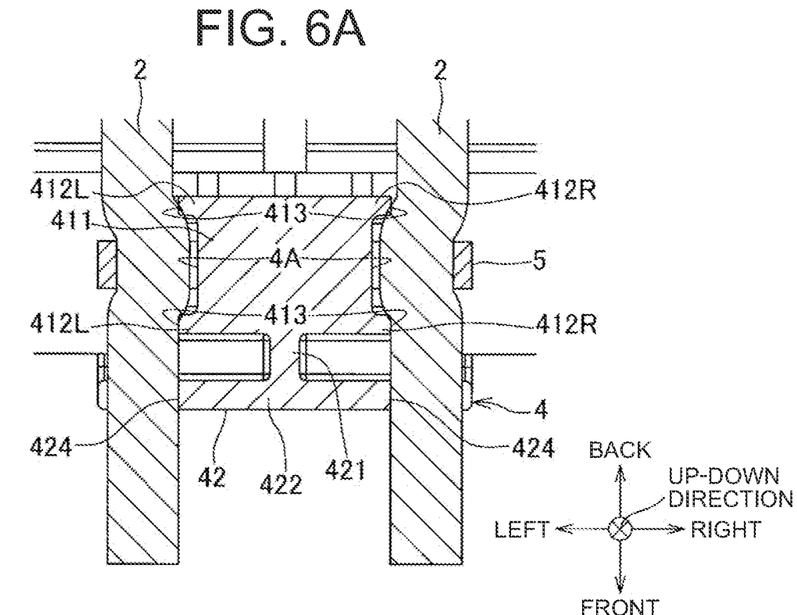
FIGS. 6A and 6B illustrate an assembly procedure of the connector for device, FIG. 6A being a cross-sectional view showing a state where electric wires are held to an electric wire holding portion, and FIG. 6B being an enlarged view of a part of FIG. 6A.
Figure 6B:
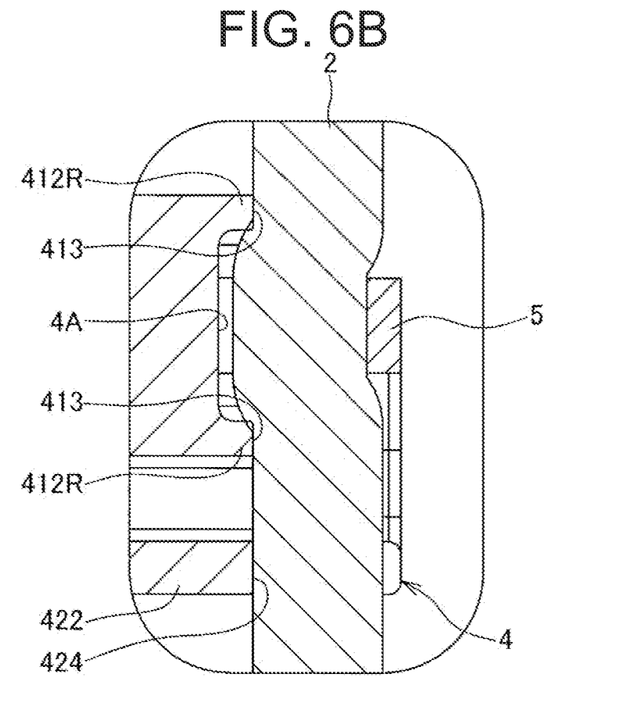

Subsequently, as shown in FIG. 4, FIG. 6A, and FIG. 6B, with the axes of the electric wires 2 extending in the front-back direction, the respective electric wires 2 are positioned on both left and right sides of the holding portion body 411 of the electric wire holding portion 41 of the front holder 4, and the electric wires 2 are accommodated in the respective recessed portions 413 of the pair of electric wire supporting portions 412L, 412L and accommodated in the respective recessed portions 413 of the pair of electric wire supporting portions 412R, 412R. In this state, the binding band 5 is wound around the holding portion body 411 and around the pair of electric wires 2, 2. At this time, the binding band 5 is wound around the holding portion body 411 such that an axis thereof is arranged in the front-back direction. The binding band 5 squeezes the respective electric wires 2 such that the electric wires 2 approach the bottom face 4A of the holding portion body 411, thereby bending the respective electric wires 2 such that the electric wires 2 approach the bottom face 4A of the holding portion body 411. Thus, the pair of electric wires 2, 2 is held to the electric wire holding portion 41 of the front holder 4.

Next, the front holder 4 is moved close to the tube-shaped insertion portion 32 of the housing 3. The respective locking projections 425 of the locking pieces 423 abut on the front edges of the pair of flat plate portions 321, 321 of the tube-shaped insertion portion 32, and the extended pieces 424 are bent outward so the respective locking projections 425 get onto the respective flat plate portions 321, and then the locking projections 425 are engaged with the to-be-locked holes 323A. Thus, the locking portion 42 is engaged with the tube-shaped insertion portion 32 of the housing 3. Thus, the electric wire holding portion 41 of the front holder 4 is positioned inside the housing 3 in a state where the locking portion 42 is engaged with the housing 3.

Subsequently, each electric wire sealing member 7 and each electric wire exterior member 8 are moved forward with respect to each electric wire 2. Each electric wire sealing member 7 and each electric wire exterior member 8 are inserted into (press fitted to) each electric wire insertion hole 310, and each electric wire exterior member 8 is engaged with the rear edge 310a of each electric wire insertion portion 310. Thus, the electric wire sealing member 7 and the electric wire exterior member 8 are installed at a predetermined position on each electric wire 2, thereby supporting each electric wire 2 on the electric wire insertion portion 310. In this way, the connector for device 1 is assembled.

Finally, the part of each electric wire 2 located on the front with respect to the front holder 4 is inserted into the opening 10a of the device housing 10 from the back side and is drawn out to the front of the opening 10a of the device housing 10, and the tube-shaped insertion portion 32 of the housing 3 is inserted into the opening 10a of the device housing 10 from the back side to place the device fixing portion 31 on the surface of the device housing 10. The bolt sealing member 6 is inserted into each bolt insertion portion 311, and the bolt 11 is inserted into the bolt insertion portion 311 and screwed to the screw hole 101 of the device housing 10. Thus, the connector for device 1 is attached to the device housing 10.

According to the above-described embodiment, the front holder 4 is configured such that, in a state where the locking portion 42 is engaged with the housing 3, the electric wire holding portion 41 is positioned inside the tube-shaped insertion portion 32 that is to be inserted into the opening 10a of the device housing 10 of the housing 3. Thus, since the electric wire holding portion 41 is positioned inside the tube-shaped insertion portion 32 of the housing 3, the electric wire holding portion 41 does not project to the outside (i.e., to the front) of the device housing 10 in the state where the connector for device 1 is attached to the device housing 10, thus the connector projecting height from the device housing 10 is reduced and the downsizing in the front-back direction (the direction in which the electric wire 2 extends) can be achieved. Further, since the electric wire holding portion 41 is positioned inside the housing 3, an access thereto from the outside is blocked and thus the electric wire holding portion 41 can be protected.

Further, the electric wire holding portion 41 includes the holding portion body 411 and the electric wire supporting portions 412L (412R), 412L (412R) which are provided in a pair at the holding portion body 411 in the direction in which the electric wires 2 extend (the front-back direction) and which project toward the electric wires 2 from the holding portion body 411 to support the electric wires 2. Further, in the state where the electric wires 2 are being supported by the pair of electric wire supporting portions 412L (412R), 412L (412R), the binding band 5 is wound around the electric wire holding portion 41 and around the electric wires 2 such that the electric wires 2 are held to the electric wire holding portion 41. Thus, since the electric wire 2 is supported by the pair of electric wire supporting portions 412L, 412L at two points with a gap in the direction in which the electric wire 2 extends, and the binding band 5 is wound around the electric wire 2, the electric wire 2 can be prevented from moving in the direction in which the electric wire 2 extends (the front-back direction).

Further, the pair of electric wire supporting portions 412L (412R), 412L (412R) is formed in a plate shape extending in the plane direction intersecting the front-back direction (the direction in which the electric wire 2 extends), and the edges thereof in the projecting direction (in the right-left direction) are cut out to form the respective recessed portions 413 for accommodating the electric wires 2. By accommodating the electric wires 2 in these recessed portions 413, the electric wires 2 can be prevented from being displaced in the up-down direction in the state where the electric wires 2 are held to the electric wire holding portion 41.

Further, the electric wires 2 are squeezed by the binding band 5 and are bent so as to approach the holding portion body 411. Thus, since the electric wires 2 are held to the electric wire holding portion 41 with the electric wires 2 bent so as to approach the bottom face 4A of the holding portion body 411, the electric wires 2 are held to the electric wire holding portion 41 in a manner the electric wires 2 cannot move in the direction in which the electric wires 2 extend (the front-back direction).

In the above-described embodiment, the electric wire holding portion 41 includes the holding portion body 411 and the pair of electric wire supporting portions 412L (412R), 412L (412R) projecting toward the electric wires 2 from the holding portion body 411 to support the electric wires 2, and the electric wires 2 are supported by the pair of electric wire supporting portions 412L (412R), 412L (412R) at two points; however, the present invention is not limited thereto. The electric wire supporting portion may be provided at one place or plurality of places adjacent to each other in the direction in which the electric wires 2 extend (the front-back direction). Consequently, the electric wires 2 are held to the electric wire holding portion 41 with the binding band 5 wound around the electric wires 2 and the electric wires 2 bent so as to approach the bottom face 4A of the holding portion body 411. Thus, in the state where the binding band 5 wound around the electric wires 2, the electric wires 2 are held such that the movement thereof in the direction in which the electric wires 2 extend (the front-back direction) is prevented.

Preferred configurations, techniques and such for implementing the present invention have been disclosed; however, the present invention is not limited to these. That is, although the present invention has been specifically shown and described mainly with respect to specific embodiments, a person skilled in the art can make various modifications to those embodiments described above in terms of shape, material, number and/or other detailed configurations without departing from the scope of technical idea and an object of the present invention. Description that may limit the shape, material and such disclosed herein is used for the illustrative purpose only to enhance understanding of the present invention and is not intended to limit the present invention. Therefore, description using name of a member without such limitation, either entire limitation or a part of limitation, regarding the shape, material and such, is also within the present invention.

LIST OF REFERENCE SIGNS 1 connector for device
2 electric wire
3 housing
4 front holder
5 binding band
41 electric wire holding portion
411 holding portion body
412L (412R) electric wire supporting portion
413 recessed portion
42 locking portion
10 device housing
10a opening (hole)

What is claimed is:

1. A connector for device configured to be attached to a device housing including a hole and configured to hold an electric wire inserted into the hole, the connector for device comprising:
   a tube-shaped housing into which the electric wire is inserted and which is configured to be inserted into one end of the hole of the device housing; and
   a front holder configured to be engaged with one end of the tube-shaped housing that is located on a side of a direction of insertion of the tube-shaped housing into the hole,
   wherein the front holder includes
   an electric wire holding portion to which the electric wire is held, and
   a locking portion that is continuous with the electric wire holding portion and that is configured to be engaged with the tube-shaped housing, and
   wherein the electric wire holding portion is positioned inside the tube-shaped housing in a state where the locking portion is engaged with the tube-shaped housing.

2. The connector for device according to claim 1, wherein the electric wire holding portion includes
   a holding portion body and
   at least one electric wire supporting portion that is provided at the holding portion body and that projects from the holding portion body toward the electric wire to support the electric wire, and
   wherein, in a state where the electric wire is supported by the electric wire supporting portion, a binding band is wound around the holding portion body and around the electric wire such that the electric wire is held to the electric wire holding portion.

3. The connector for device according to claim 2, wherein the electric wire supporting portion is formed in a plate shape that extends in a plane direction intersecting a direction in which the electric wire extends, and
   the electric wire supporting portion includes a recessed portion for accommodating the electric wire, the recessed portion being formed by cutting out an edge of the electric wire supporting portion located in a direction in which the electric wire supporting portion projects.

4. The connector for device according to claim 2, wherein the electric wire is squeezed by the binding band and is bent so as to approach the holding portion body.

* * * * *